(No Model.)
M. DELANO & O. L. CUMMINS.
CLOD CRUSHER AND GROUND LEVELER.
No. 379,565. Patented Mar. 20, 1888.
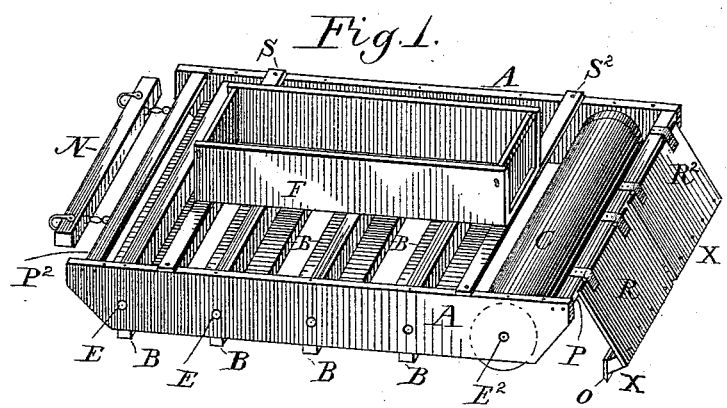
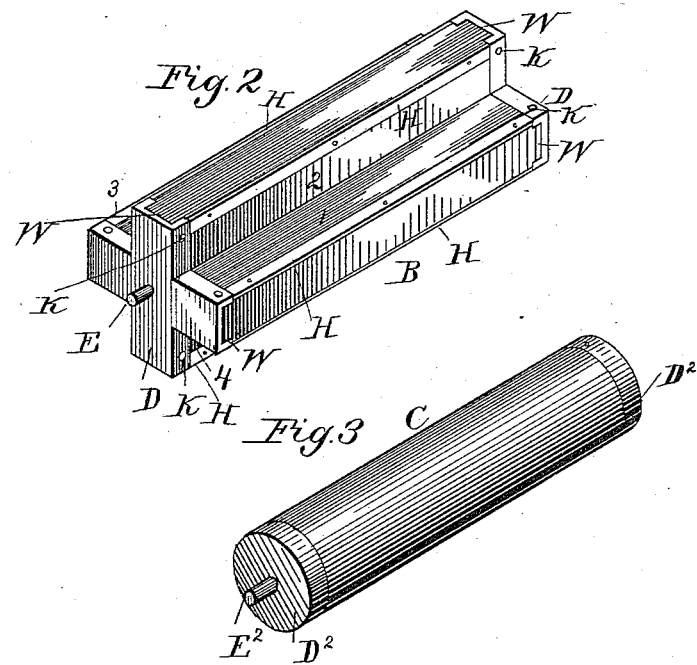
Witnesses.
Inventors,
Milton Delano,
Orin L. Cummins,
per O. H. Woodworth,
Attorney in fact.

UNITED STATES PATENT OFFICE.

MILTON DELANO AND ORIN L. CUMMINS, OF NEAR COLUMBIA CITY, INDIANA.

CLOD-CRUSHER AND GROUND-LEVELER.

SPECIFICATION forming part of Letters Patent No. 379,565, dated March 20, 1888.

Application filed August 29, 1887. Serial No. 248,205. (No model.)

*To all whom it may concern:*

Be it known that we, MILTON DELANO and ORIN L. CUMMINS, citizens of the United States, residing at near Columbia City, Whitley county, Indiana, have jointly invented a new and useful Improvement in Clod-Crushers and Ground-Levelers, of which the following is a specification.

Our invention relates to improvements in clod-crushers and ground-levelers constructed in such a manner as to effectively crush the clods of earth and level the ground for agricultural purposes.

The objects of our invention are to provide a combined clod-crusher and ground-leveler that shall be simple in construction, easily and effectively operated, and that shall not be liable to get out of order. We attain these objects by the mechanism illustrated in the accompanying drawings, in which—

Figure 1 is a general view in perspective of our improved clod-crusher and ground-leveler. Fig. 2 is an enlarged view in perspective of one of the crushers employed by us in our invention when in practical use, and Fig. 3 is a view of the roller used by us in our improved clod-crusher and ground-leveler.

Similar letters refer to similar parts throughout the several views.

A A represent the sides of our clod-crusher and ground-leveler, held in position by cross-bars P and $P^2$, and also by S and $S^2$, on which rests the stone-box F, on which may be placed a driver's seat, if desired. Between sides A A are held the crushers B B B and roller C, by which the clods are crushed and the ground leveled. The journals of the crushers and of the roller are shown in the bearings in the sides A A at E E and $E^2$.

The construction of the crushers is shown in detail at Fig. 2, in which 1, 2, 3, and 4 indicate four wooden flanges, which mainly constitute the crusher, which is bound, strengthened, and protected by the cast-iron heads D D, each provided with a journal, E, cast solidly with the head, and each head having four open box-like extensions, W W, embracing the ends of the four flanges, to which they are firmly attached by bolts K K, extending through the flanges and extensions from side to side. Each of the four flanges are further strengthened and protected by iron bars H H, let in and fastened to their two outward edges and extending the whole length of the flanges between the inner portions of the extensions of the two heads attached to each crusher.

To the cross-bar P at the rear of each machine are hinged two or more levelers, R and $R^2$, made of planks or boards or their equivalents, and having fastened across their lower ends pieces of timber X, of proper weight and size, lengthwise of and on the under and inner side of which are fastened scrapers or leveling-blades $o$, of wood or metal, at such an angle as to most effectively scrape and level the surface of the ground. The leveling attachment herein described being made in two or more separate parts in order that uneven surfaces may be more effectively leveled.

The roller C is provided with iron heads $D^2$ with journals $E^2$, cast solidly with the heads, which are attached to the roller by bolts or otherwise.

The practical operation of our improved clod-crusher and ground-leveler is substantially as follows: A team being attached to the hitching-bar N and the crusher and leveler drawn forward over lumpy or cloddy plowed ground, the roller C and crushers B B are caused to revolve in the direction of the arrows, and thus the iron bound flanges of the crushers are successively brought in contact with the clods of earth, thereby crushing them, and the roller, following immediately after the crushers, levels the ground almost completely; but any portion of the ground not leveled by the roller is quite effectively leveled by the blades or scrapers $o\ o$, attached to lower edges of levelers R and $R^2$.

Our improved clod-crusher and ground-leveler is so constructed as to be readily taken apart or put together, as may be desired.

The stone-box is used for gathering stones, &c., when passing through the fields or for carrying weights when additional crushing and leveling force is required.

We claim as our invention and desire to secure by Letters Patent of the United States—

In a clod-crusher and ground-roller, the combination of the sides A A, crushers B B, roller C, crusher-heads D D with journals E, bars or straps H H, flanges 1, 2, 3, and 4, roller-heads $D^2$ with journals $E^2$, levelers R and $R^2$ with blades o o, and stone-box F, all substantially as and for the purposes set forth and specified.

MILTON DELANO.
ORIN L. CUMMINS.

Witnesses:
B. F. SNYDER,
O. H. WOODWORTH.